United States Patent
Pocklington et al.

(10) Patent No.: US 9,141,940 B2
(45) Date of Patent: Sep. 22, 2015

(54) CHECKING ELECTRONIC MESSAGES FOR COMPLIANCE WITH USER INTENT

(75) Inventors: Richard Pocklington, San Francisco, CA (US); Jonathan Betts-Lacroix, San Mateo, CA (US)

(73) Assignee: Google Inc., Mountain View, CA (US)

( * ) Notice: Subject to any disclaimer, the term of this patent is extended or adjusted under 35 U.S.C. 154(b) by 323 days.

(21) Appl. No.: 12/756,435

(22) Filed: Apr. 8, 2010

(65) Prior Publication Data
US 2010/0198931 A1 Aug. 5, 2010

Related U.S. Application Data

(63) Continuation of application No. 12/044,892, filed on Mar. 7, 2008, now abandoned.

(51) Int. Cl.
| | |
|---|---|
| G06F 13/00 | (2006.01) |
| G06Q 10/10 | (2012.01) |
| H04L 12/58 | (2006.01) |

(52) U.S. Cl.
CPC .............. *G06Q 10/107* (2013.01); *H04L 12/58* (2013.01)

(58) Field of Classification Search
CPC .............................. G06Q 10/107; H04L 12/58
USPC .............. 709/224, 204–206; 706/16, 21, 23; 715/751–759; 434/350–351; 707/758, 707/769, 780
See application file for complete search history.

(56) References Cited

U.S. PATENT DOCUMENTS

| | | | |
|---|---|---|---|
| 2004/0103162 A1 | 5/2004 | Meister et al. | |
| 2004/0111479 A1* | 6/2004 | Borden et al. | ................ 709/206 |
| 2005/0278430 A1 | 12/2005 | Cato | |
| 2006/0026246 A1 | 2/2006 | Fukuhara et al. | |
| 2006/0031338 A1 | 2/2006 | Kang et al. | |
| 2006/0047766 A1 | 3/2006 | Spadea | |
| 2009/0177617 A1 | 7/2009 | Lee | |
| 2009/0210504 A1 | 8/2009 | Shuster | |
| 2009/0228583 A1* | 9/2009 | Pocklington et al. | ......... 709/224 |

* cited by examiner

*Primary Examiner* — Kenneth R Coulter
(74) *Attorney, Agent, or Firm* — Morris & Kamlay LLP

(57) ABSTRACT

Intention data is used to determine an intent of a sender of a message, or other participant, in an electronic communication system such as an email system. For example, a message that is designated for sending can be compared to the sender's intention data and if a discrepancy or deficiency is detected between the sender's determined intent and the actual message then an action is taken such as providing an alert to the sender or to another person, process or device; requiring an action by the sender such as confirming the message, making an edit, checking information, etc.

30 Claims, 6 Drawing Sheets

From: Charlie@trelaw.com
Sent: 3/25/07 10:11AM
To: Richard@qqq.com
cc: Jory@qqq.com
bcc:
Subject: Possible patents in next OQO product release 110→ Hey Richard, 112→ I went over the list of inventions that the engineers came up with. I think all of the ideas are good candidates and items 8 and 10 could be broken out into multiple patents, if desired. This portable computer product is pure genius.

114→ BTW, did I tell you that a patent I wrote got licensed for 100M?

116→ Charlie cell555-555-1212

118→ Tre Law Group, PC
1900 Em Road, Suite 109
Palo Alto, CA 94303
ph: 555-555-3000
fax: 555-555-3004

This e-mail is confidential and is intended only for the named recipient(s) and may contain information that is privileged, attorney work product or exempt from disclosure under applicable law. If you have received this message in error, or are not the named recipient(s), please immediately notify the sender and delete this e-mail message from your computer. Thank you.

*Figure 2A*

From: Richard@qqq.com  /120
Sent: 3/28/07  3:40pm
To:   Charlie@trelaw.com
cc:   Jory@qqq.com
bcc:  [Jacques@qqq.com]
Subject: Possible patents in next OQO product release Thanks Charlie. Let's go with the list we have and if the patent office makes a restriction requirement we will deal with it at that time.

Richard

/122

From: Charlie@trelaw.com  /102
Sent: 3/25/07  10:11am
To:   Richard@qqq.com
cc:   Jory@qqq.com
bcc:
Subject: Possible patents in next OQO product release Hey Richard, I went over the list of inventions that the engineers came up with. I think all of the ideas are good candidates and items 8 and 10 could be broken out into multiple patents, if desired. This portable computer product is pure genius.

BTW, did I tell you that a patent I wrote got licensed for 100M?

Charlie cell555-555-1212

Tre Law Group, PC
1900 Em Road, Suite 109
Palo Alto, CA 94303
ph: 555-555-3000
fax: 555-555-3004

*Figure 2B*

From: Jacques@qqq.com
Sent: 3/28/07  3:45pm
To:    Richard@qqq.com
cc:    Jory@qqq.com; Charlie@trelaw.com
bcc:
Subject: Possible patents in next OQO product release

130

Why is the attorney always trying to make multiple
applications out of the ideas we submit? I told you to drop this guy weeks ago.

Jacques

---

From: Richard@qqq.com
Sent: 3/28/07  3:40pm
To:    Charlie@trelaw.com
cc:    Jory@qqq.com
bcc:   [Jacques@qqq.com]
Subject: Possible patents in next OQO product release

120

Thanks Charlie. Let's go with the list we have and if the patent office makes a
restriction requirement we will deal with it at that time.

Richard

---

From: Charlie@trelaw.com
Sent: 3/25/07  10:11am
To:    Richard@qqq.com
cc:    Jory@qqq.com
bcc:
Subject: Possible patents in next OQO product release

102

Hey Richard,

I went over the list of inventions that the engineers came up with. I think all of the
ideas are good candidates and items 8 and 10 could be broken out into multiple
patents, if desired. This portable computer product is pure genius.

BTW, did I tell you that a patent I wrote got licensed for 100M?

Charlie cell 555-555-1212

Tre Law Group, PC
1900 Em Road, Suite 109
Palo Alto, CA 94303
ph: 555-555-3000
fax: 555-555-3004

*Figure 2C*

From: Charlie@trelaw.com
Sent: 3/29/07 2:35am
To: Jacques@qqq.com
cc: Jory@qqq.com; Richard@qqq.com
bcc:
Subject: Possible patents in next OQO product release

140

Jacques you are a Neanderthal.

---

From: Jacques@qqq.com
Sent: 3/28/07 3:45pm
To: Richard@qqq.com
cc: Jory@qqq.com; Charlie@trelaw.com
bcc:
Subject: Possible patents in next OQO product release

130

Why is the attorney always trying to make multiple applications out of the ideas we submit? I told you to drop this guy weeks ago.

Jacques

---

From: Richard@qqq.com
Sent: 3/28/07 3:40pm
To: Charlie@trelaw.com
cc: Jory@qqq.com
bcc: [Jacques@qqq.com]
Subject: Possible patents in next OQO product release

120

Thanks Charlie. Let's go with the list we have and if the patent office makes a restriction requirement we will deal with it at that time.

Richard

---

From: Charlie@trelaw.com
Sent: 3/25/07 10:11am
To: Richard@qqq.com
cc: Jory@qqq.com
bcc:
Subject: Possible patents in next OQO product release

102

Hey Richard,

I went over the list of inventions that the engineers came up with. I think all of the ideas are good candidates and items 8 and 10 could be broken out into multiple patents, if desired. This portable computer product is pure genius.

BTW, did I tell you that a patent I wrote got licensed for 100M?

Charlie cell 555-555-1212

Tre Law Group, PC
1900 Em Road, Suite 109
Palo Alto, CA 94303
ph: 555-555-3000
fax: 555-555-3004

*Figure 2D*

CHECKING ELECTRONIC MESSAGES FOR COMPLIANCE WITH USER INTENT

This is a continuation of U.S. Ser. No. 12/044,892, filed Mar. 7, 2008, now abandoned, the contents of which are hereby incorporated.

FIELD OF THE INVENTION

The invention relates in general to electronic communications and more specifically to a system for checking and/or revising electronic messages by using data about a user's intent.

BACKGROUND

The prevalent use of electronic communications often requires a high level of care to make sure that the communication is properly crafted and sent to the proper recipients. Electronic mail (email), text messages, chat messages, web logs (blogs), newsgroup postings, etc. are each examples of types of electronic communications, or messages. Although these messages are often important, or even critical, to a sender's profession, education, relationship, happiness or other aspect of life, there is a tendency for senders to draft and send a message quickly. This haste may result in errors, omissions, inclusion of inappropriate or sub-optimal comments or statements, or other unwanted effects.

Even where senders have the best intentions and are mindful of their message composition and sending parameters, the number of features and level of complexity in today's electronic communications can cause mistakes. For example, email systems allow different options such as whether to reply to an original message using only the original message's sender, replying to everyone on the carbon copy (CC) list, using local or global distribution lists, placing some recipients in a blind carbon copy (BCC) list, forwarding the message; adding, deleting or editing names, content and attachments prior to sending, changing the order of name listing, sending to multiple email addresses or aliases for a same person, etc. There are many other options associated with sending an email message and each option can lead to multiple possible parameters or values.

Thus, a sender may fail to consider all the necessary options or characteristics, or may make a mistake in handling a message characteristic, thereby sending an electronic communication that does not achieve an intended result.

SUMMARY

A preferred embodiment of the invention uses "intention data" to determine an intent of a sender of a message or other user in an electronic communication system. For example, a message to be sent can be compared to the sender's intention data which indicates the sender's probable intent. If a discrepancy is detected between the sender's determined intent and a part of the actual message then an action is taken. An action can include providing an alert to the sender or to another person, process or device. An action can also require that the sender confirm the message's content or characteristics, edit the message or the message's transmission parameters, further check the message against other external information, log an event, etc.

Intention data can be acquired by a monitoring process executing within or in association with a part of an electronic communication system. A preferred embodiment uses "usage information" to derive a user's intent. The usage information can include past or current activity of the user, such as an identified pattern of use of the communication system by a sender with respect to one or more recipients. For example, usage patterns can include frequency of correspondence, type of message content usually sent to a recipient, detecting common groups of recipients, etc. Intention data can also be obtained from non-pattern information such as by an analysis of one or a few email messages. For example, a degree of formality, friendliness or other relationship attributes may be determined from one message which does not necessarily depend on a pattern. A value for a relationship attribute can be used to analyze and react to subsequent messages. Intention data can also be obtained directly from a user or other person as, for example, in response to a question or prompt, or by monitoring a person's behavior. Intention data may also be obtained or derived from other non-human sources such as databases, records, files, other devices or processes (e.g., phone calls, global positioning system (GPS) determination of location, web page browsing, etc.), or other sources.

Once intention data is obtained it is used by an analysis process to compare against a message to be sent. If a discrepancy is detected it is determined that the message to be sent (or received, transferred or otherwise processed) may not comport with a user's intent. In response to detecting a discrepancy, a control process is invoked that takes an action such as generating an alert, suggesting a change, automatically making a change to the message or the way the message is handled, logging the event, etc.

In one embodiment the invention provides a method for processing an electronic communication, the method comprising: obtaining intention data, wherein the intention data indicates an intent of a user with respect to the user's electronic communications; accepting a signal from an input device to define content for a present electronic communication; determining that the present electronic communication is associated with the user; detecting a deficiency by analyzing at least a portion of the present electronic communication and the intention data; and performing an act to correct the deficiency.

BRIEF DESCRIPTION OF THE DRAWINGS

FIG. 2A shows a first example email message;

FIG. 2B shows a second email message in an example thread;

FIG. 2C shows a third email message in an example thread;

FIG. 2D shows a fourth email message in an example thread; and

DETAILED DESCRIPTION

Figure 1:
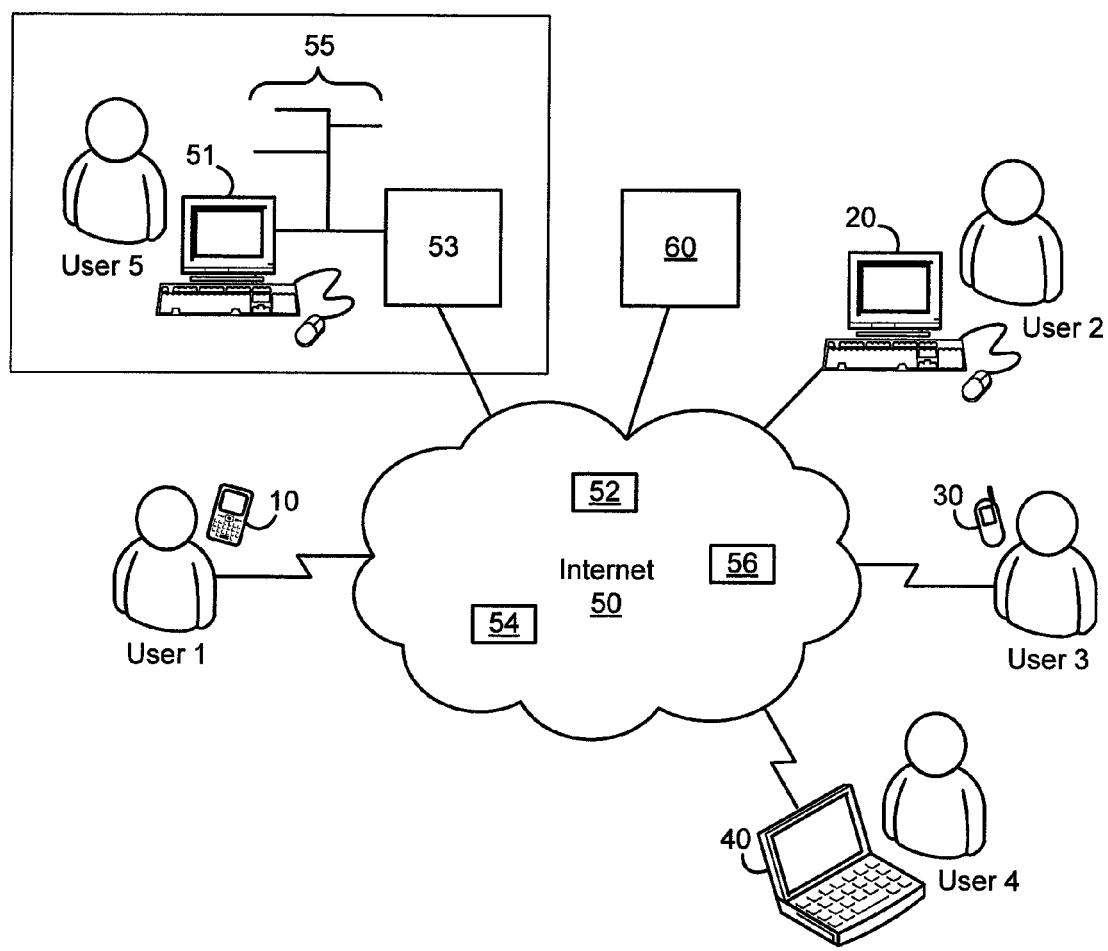
FIG. 1 illustrates basic components in an electronic communications system suitable for use with the invention.

FIG. 1 illustrates basic components in an electronic communications system suitable for use with the invention. Note that although features may be discussed with respect to specific components or systems that the features can be adapted to any one or more suitable systems, devices, processes, components, networks or other combinations of hardware and/or software.

In FIG. 1, users such as 1, 2, 3, 4 and 5 operate devices for electronic communications. For example, User 1 operates portable email device 10, User 2 operates desktop computer 20, User 3 operates cell phone 30, User 4 operates laptop 40 and User 5 operates desktop computer 51 connected to local server 53 and other devices (not shown) via a local area network (LAN) 55. Note that any number and type of devices with different suitable network topologies and interconnections can be adapted for use with embodiments of the invention. Further, although features of the invention may be described with respect to a specific user associated with a specific device, other types of associations of human users with devices or processes can be used, as desired, in order to achieve the functional effects described herein. Multiple users can be associated with a device or devices and multiple devices can be associated with a user or users. In some applications, communications need not involve a human sender, intermediary and/or receiver as these roles might be performed automatically as where an email system sends automatically generated messages to humans or devices.

In FIG. 1, the devices communicate with each other and with server 60 via a digital network such as Internet 50. Such communication can be by any physical link, protocol, data format or other convention, as desired. For example, wired connections such as shown for servers 60 and 53, and for desktop computer 20 may be employed. Or wireless connections such as shown for portable email device 10, cell phone 30 or laptop 40 may be used. As is known in the art, Internet 50 allows for dynamic and varied communications between devices and processes such as switches, routers, repeaters, servers, etc. These are shown symbolically as components 52, 54 and 56. Similarly, LAN 55 can be used to connect different devices at a locally controlled or maintained network such as a corporate or campus LAN, home network, etc.

As is known in the art, there are many ways to organize and interconnect devices and processes, and to arrange for communication protocols, formats and standards. For example, an email system may be organized as a point-of-presence (POP3) or Internet Message Access Protocol (IMAP) system with a local or remote email server. The email system can support message formats and protocols such as Multipurpose Internet Mail Extensions (MIME), Simple Mail Transfer Protocol (SMTP), etc. A text messaging system can use cell phone or wireless data connections to handheld devices that comply with standards such as Global System for Mobile Communications (GSM) and include Short Message Service (SMS), Multimedia Messaging Service (MMS), etc. Other custom or proprietary systems can be used such as J-Phone's SkyMail™ and NTT Docomo's Short Mail™, etc.

In general, any type of electronic communication system for delivery of information intended for at least one human recipient can be used with features of the present invention, including future-developed systems, standards and protocols. Because of the large flexibility in communication systems and processing systems, it should be apparent that functions or features described herein can be performed by any number, type and combination of hardware and software components. Functions can be performed at the same or different places in time or space by one or more components. In some implementations, components may be omitted or called by a different name from those shown in the examples. Further, various aspects of the invention can apply regardless of the organization of components or resources into different managed or controlled groups, such as Internet access provided by a company, a server operated by a third party, etc.

A typical method of sending an electronic communication such as an email message could involve User 1 creating message content and sending the content included in an initial email message. The message could be transferred first to server 60 for further processing such as to resolve recipient network addresses, determine destination servers, etc. In other embodiments, message delivery need not use a server as some types of communication may be peer-to-peer or can use a device other than a server. The user of terms designating items such as "client," "server," "sender," "recipient," "initial message," "reply message," etc. should not be construed as limiting the invention. Rather they are used to provide an example. It should be apparent that such terms may be interchanged and the resulting system or method will remain within the scope of the invention. Items may also be omitted. For example, a sender may send an initial message to a hardware device or software process such as to send a database query, purchase order, blog posting, turn on a light, etc.

As correspondents and participants exchange messages, characteristics of the messages and exchanges are compiled by a monitor process. The monitor process provides the characteristic data to an analysis process to derive intent data— i.e., data that indicates intent of a sender, recipient or other participant ("users") of the messages. One way of using the compiled message characteristic data to identify user intent is to analyze prior patterns of use. Another way to establish user intent is by querying users, analyzing the way user's or automated processes react to a particular user, and by other methods, described in more detail, below. Once user intent data is obtained then a particular user's electronic messages can be compared to the intent data by a control process. When a discrepancy is determined then the control process can initiate an action such as alerting a user, delaying transmission, automatically correcting or changing a characteristic of the communication, etc.

Figure 3:
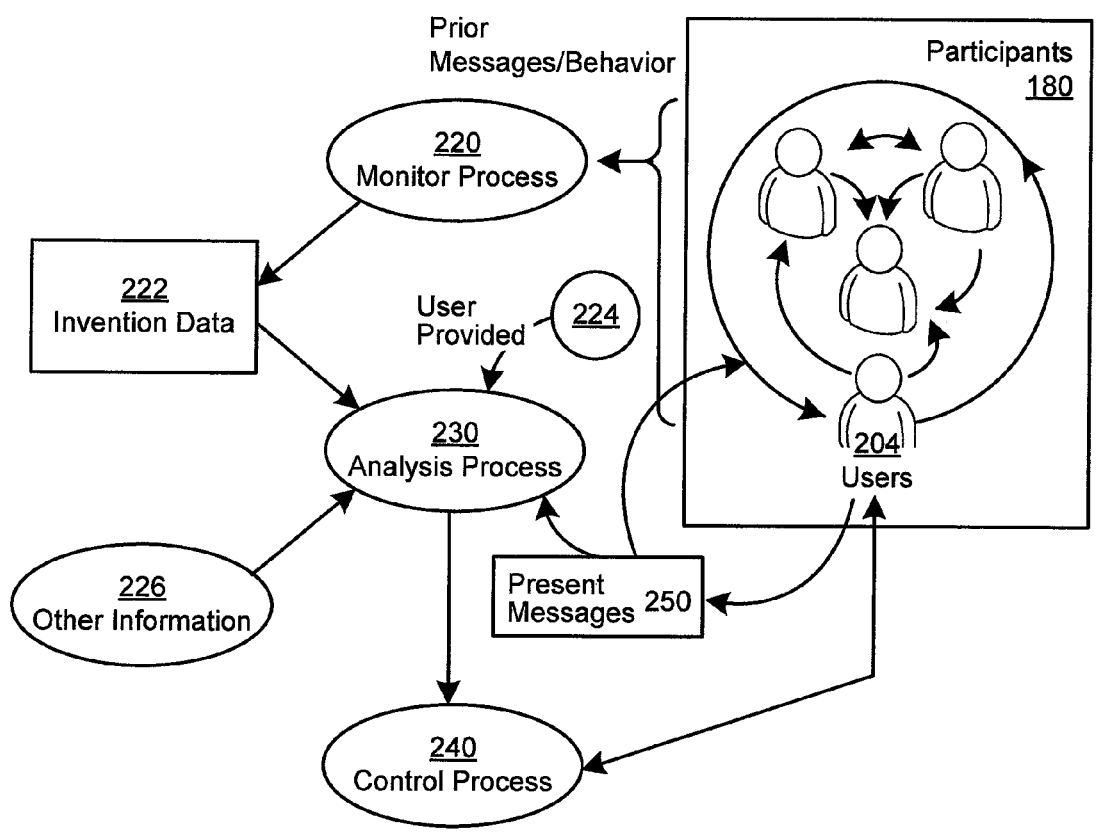
FIG. 3 illustrates basic components and steps of a messaging system.

FIG. 3 illustrates basic components and steps of a messaging system in a preferred embodiment of the invention, as described, above. In FIG. 3, participants 202 include multiple users of the messaging system. Portions of the participants' messages and activity are recorded by monitor process 220. Monitor process uses observations about the messages and activity to generate intention data 222. Such data can be any information that is useful to determine a user's intent with respect to a communication.

For example, each user's email traffic can be recorded to include header information (sender, receiver, other recipients, date and time sent or received, subject, etc.) and content, if desired. Statistics, summary data or other data of communications with another user, device, process, group of users, organization, or other entity can be maintained. Such data can include the frequency of corresponding with another user, the time intervals between responses, the amount of time spent composing or reading a message, the other people that were included in messages, the tone or meaning of a message, etc.

Many different characteristics of a message or communication can be monitored including those listed in Table I, below.

**************** BEGIN TABLE I *******************

Characteristics of Outgoing Messages:

1: Lacks certain header properties i) given the messages other header information ii) given the messages other body content iii) given previous messages header information -continued iv) given previous messages body content
        v)
2: Lacks an characteristic or property it purports to contain
        I an attachement
        II a recipient
        III the response to a query
        IV information necessary for the effective delivery of the message
3: Contains content that:
        i) is likely to have an effect on the recipient other than that which is intended
           A) in a response
           B) in a response in another medium
        ii) is likely to generate another recognizable pattern of response
        iii) is likley to generate an unrecognized pattern of response
        vi) has a low probability of generating a response
        vii) may caused anger, frustration or other negative effects on the recipient
        viii) is unlikey to cause the intended reponse or intended action
4: is similar to other emails you have sent:
        i) within or outside some range of time
        ii) to the same recipient
        iii) to other recipients, either explictly or implicitly defined
        iv) to recepients which have a relationship to the chosen recipient(s)
        v) to recipients which have been flagged for some other reason or purpose
5: differs in style, tone, format or content from emails from your chosen recipient(s) which have a relationship to the chosen recipient or recipients or are otherwise categorized as relevant
6: differs in style, tone, format or content from emails sent by other senders to the chosen recipient(s) or recepients which have a relationship to the chosen recipient or recipients or are otherwise characterized as relevant
7: falls within a certain range of times between receipt of other messages, either from the last message, or on average,
        a) from this recipient
        b) from other recipients
8: contains information which can be identified as
        a) sensitive
        b) proprietary
        c) providing some legal risk
        d) referencing a Patent
************* *** END TABLE I ****************

Intention data is used by analysis process 230 along with other optional information such as user provided information 224, or information from other sources such as external databases, devices, processes, etc.

When a user such as User 204 creates a new message such as present electronic communication 250, control process 240 determines whether there is a discrepancy between a user's intent and the probably meaning or effect of the message content or a message characteristic. If a discrepancy is detected then an action is taken such as alerting the user, requiring a user action before sending the message, requiring a change to the message, automatically making a change to the message, etc.

Table II lists examples of types of actions that might be taken. Any one or more of these actions can be controlled by a system administrator or other entity, or provided in settings that are selectable by the user, as desired. Other actions are possible.

**************** BEGIN TABLE II ******************
Examples of Actions:
    1: a hold time on a message before it leaves the sender's outbox
    2: the addition of an attatchment to a message
    3: modifications to outgoing message parameters, including
        i: changing a recipient
        ii: modifying the title
        iii: modification to the urgency level, date stamp or other parameters of the message header
        iv: alterations to the content of the message, including
            A: distortions, particularly in the case when the application which makes such distortions is executed without the knowledge of the email sender and or recipient
            B: modifications, including those meant to
                i: repair the message
                ii: remove the material which generated the flag
                iii: further stress the material which generated the flag
                iv: optimize, maximize, minimize or otherwise modify the likelihood of such events as:
                    1) receipt of an email in return
                    2) receipt of an email with particular parameters which include:
                        a: presence of a similar flag
                        b: presence of a specific flag
                        c: of a certain length d: within a certain time range
                    e: a number of responses
                3) the quantity of total emails in a thread
                4) the length of time the thread persisted
                5) any other measureable parameter of:
                    a: the email message content
                    b: its header information
                    c: the headers of other emails in the thread
                    d: the content of other messages in the thread
                    e: the header or content of other messages linked to this thread
                        A) by shared author
                        B) by shared content
                        C) by another algorithm which determines the two or
                            more messages, authors or threads are related
            C: deletions: particularly in the case of the deletion of an area of the content
                of the message flagged as:
                1) incorrect
                2) dangerous
                3) provocative
                4) uninformatinve
                5) political
                6) unlikely to generate a desired response
                7) likely to generate an undersirable response
    4: the generation of a dialog box which requires further input to continue the message,
        such as:
            i: a password
            ii: a confirmation code
            iii: a unique identifier such as
                A: a citizenship code
                B: a passport number
                C: a social security number
            iv: the solution to a logic puzzle or other test of sobriety or patience
**************** END TABLE II *******************

FIGS. 2A-D show email communications and the development of an email thread. An initial sender, Charlie@trellislaw.com, created and sent initial email 102 of FIG. 2A on Mar. 25, 2007 at 10:11 am to Richard@oqo.com. Another recipient, jory@oqo.com, was also "carbon copied" in a "CC". The subject of the email message is "Possible patents in next OQO™ product release". The preceding information resides in header 104. Body 106 includes the content of the email message which discusses ideas that might be patented in OQO, Inc.'s next product release. The content includes typical parts such as greeting 110, first paragraph 112, second paragraph 114, signature 116 and contact information.

FIG. 2B shows first reply 120 from Richard@oqo.com sent Mar. 28, 2007 at 3:40 pm to Charlie@trellislaw.com with a CC to jory@oqo.com and a blind CC (BCC) to Jacques@oqo.com with a subject "Possible patents in next OQO product release". Note that a BCC is not shown to any of the recipients but is shown in FIG. 2B for discussion purposes. Separator 122 is used to indicate the end of the reply, and initial email 102 has been automatically copied and included in the response by Richard's email system.

FIG. 2C shows a second reply from Jacques who was a blind CC. Jacques has replied to the sender and every other recipient on the prior email. Jacques email system automatically placed Richard on the "to" line and Jory and Charlie on the "CC" line so that all three would receive a response. Prior email in the thread, i.e., initial email 102 and first reply 120, are copied into Jacques reply, as shown.

FIG. 2D shows third reply 140 from Charlie in response to Jacques' email. This completes the example thread which shows the entire communication as a series of the email messages in a reverse order from which they were sent, namely 140, 130, 120 and 102.

Next FIGS. 2A-D are discussed again to describe various features and functions of embodiments of the invention.

Assuming that Richard and Charlie have corresponded before, intent data exists in the form of a profile associated with each of these users. The profile can be derived from characteristics of their prior communications. One basic function that can be provided includes handling of predefined text either for auto-insertion or for insertion on command, such as if a sender activates a control prior to sending a message.

For example, many professional such as attorneys, agents, corporate officers, or others who deal with confidential information include a paragraph or more of notification text appended to the bottom of every email message. An example of such notification text is shown below in Table III.

TABLE III

************ BEGIN TABLE III *******************
    This communication, including any attachments, is confidential and
may be protected by privilege. If you are not the intended recipient, any
use, dissemination, distribution, or copying of this communication is
strictly prohibited. If you have received this communication in error,
please immediately notify the sender by telephone or email, and
permanently delete all copies, electronic or other, you may have.
    To ensure compliance with requirements imposed by the IRS, we
inform you that any tax advice contained in this communication (including
any attachments) was not intended or written to be used, and cannot be
used, for the purpose of (i) avoiding penalties under the Internal Revenue
Code or (ii) promoting, marketing or recommending to another party any
transaction or matter addressed herein.
The foregoing applies even if this notice is embedded in a message that
is forwarded or attached.
************* END TABLE III *******************

The notification text is typically appended automatically by an email sending process to every email sent by the sender. Naturally, the amount of appended notification text tends to become larger as time goes by. An embodiment of the invention acts to suppress the notification text when it has been established that the recipients on an email have already received the notification text before. The parameters of suppressing the text can vary. For example, the notification text may be sent only once and then suppressed. Or a threshold number of times (e.g., twice, 5 times, etc.), or frequency (once a week, month, etc) can be implemented so that a recipient only receives the notification text every so often. If the content of the notification text changes then values or counters associated with the parameters can be reset so that recipients are treated as not having seen the text before.

Other factors or conditions can be used to determine whether insertion text or other text should be included in an email or not. For example, a pattern of use may be established so that the monitoring process can detect when an unusual or new combination of recipients is being used. For example, if a sender has used a group of recipients in the past and a present attempt at sending includes that same group plus a new recipient not in that group then the sender can be alerted about the new recipient prior to sending the message. Another alternative is to include the insertion text only for the new recipient. Detection of the new recipient can be by usage patterns, which are discussed in more detail, below. Or by analysis of the recipients' email domains, geographic location, use of external data to show affiliation with an organization, frequency of correspondence, etc. These factors are discussed in more detail, below.

Other types of predefined text can be similarly handled. For example, another popular type of predefined text is contact information 118 in FIG. 2A. If the monitor process already establishes that a user has already received the contact information with sufficient occurrence and/or frequency then a sender may have a parameter in their intent data or profile to suppress the contact information even if other settings in the email system call for insertion of the contact information. Variations on regulating predefined text are possible.

In another embodiment, a classification of a relationship of the sender to a recipient is maintained. The relationship classification can be made based on user input, monitoring of messages, or by other techniques. For example, a relationship between the sender and receiver can be designated by relationship attributes such as "professional," "friendly," "trusted," "romantic," etc. Each relationship attribute can have a value such as −10 to 10 where 10 could be "most friendly" and −10 could be "least friendly," for example. Many other attributes and ways to associate a value with an attribute are possible. A user can set the values of the relationship attributes in pairs based on the relationship of a particular user with each other possible participant in a communication. Or an automatic default can be used such as zero.

As time goes by the particular user (or another user) may modify the attributes' values. Or modification of the relationship attributes can be modified based on an analysis process' analysis of messages from data obtained by a monitor process. For example, as explained in more detail below, if a sender continually uses familiar, funny, excited or intimate or other "friendly" types of language constructs with a particular recipient than the sender/recipient "friendly" value can be increased over time by the analysis process. The analysis process can use simplified or complex techniques to make a determination for a relationship attribute value adjustment. For example, predefined "friendly" keywords can be defined so that a simple keyword match can be used to analyze a message. If a user sends personal information such as a home phone number, cell phone number, bank account, password, social security number, etc., it can be registered that the recipient is at an elevated level of friendship or trust.

The time of messages being sent can be considered in establishing a relationship attribute's value. If a pair of users are recorded as predominantly sending only during business hours then the relationship's professional attribute can increase and the friendship attribute can decrease. Similarly, if messages are sent at all hours of the day and night then the professional attribute can decrease while the friendship attribute can increase. Naturally, any one or more attributes may be affected by such monitoring of user characteristics. Other suitable approaches for analyzing message characteristics and user behavior or intent can include using natural language processing (NLP) techniques such as latent semantic indexing (LSI), latent semantic analysis (LSA), etc.

Once a relationship classification has been established then it can be used to analyze messages to determine if a discrepancy exists between a participant's intent and the likely meaning or predicted effect of a message to be sent.

For example, in FIG. 2A, there is evidence of a friendly relationship between Richard and Charlie since at line 110 the greeting is the more informal "Hey, Richard," instead of simply "Richard," or even "Hi, Richard,". A hierarchy of familiarity or friendliness in salutations can be created as shown in the example of Table IV.

TABLE IV

************* BEGIN TABLE IV ******************
| | | |
|---|---|---|
| Rich Whazzup! | | 10 ← More Familiar |
| Hey, Richard, | 9 | |
| Hi, Richard, | 8 | |
| Richard, | | 7 |
| Dear Richard, | 6 | |
| Richard Smith | 5 | |
| Mr. Richard Smith | 4 | |
| Sir | | 3 |
| Sir/Madam | | 2 |
| To Whom It May Concern | 1 ← Less Familiar | |

*********** END TABLE IV *********************

Naturally, many different types of keywords, classifications, and hierarchies can be used other than that shown in Table II. Once established, the hierarchy can be compared to the appropriate relationship attribute's value and a determination can be made to take action if there is a discrepancy. So, for example, if the "friendly" attribute between Richard and Charlie is 8 then any of the salutations in Table IV with values 7-10 may be deemed acceptable and use of other salutations may be flagged so that the sender, Charlie, would be alerted before the email is sent that the greeting may be more formal than is desired in order to maintain the friendship at a desired or intended level. Such mistakes in maintaining a social relationship may occur inadvertently as where more time than usual has gone by between communications, when a relationship is first being formed and is progressing, when an event occurs to change the relationship, etc.

Similarly, the Richard/Charlie friendship attribute can be defined by a parameter associated with Richard's profile or intent data. This number need not be the same as the Charlie/Richard friendship attribute. One feature allows checking the recipients' corresponding parameter and using the recipient parameter to alert the sender or to modify the salutation. For example, if Charlie is sending Richard an email but it is detected that Richard's profile has a Richard/Charlie friendship value of 3 then a more formal salutation may be suggested than what Charlie had initially used. The exposure of different users' profile parameters to other users can be by consent of each user, as desired. Some parameters will not be so sensitive and can be made global by assumed consent of all users, or an administrator or other manager, business owner, or entity (e.g., government, parent, etc.) may have overriding authority to view, use, manipulate, manage or otherwise control parameters of others.

Other recipients' relationship attributes can be taken into consideration. For example, the Jory/Charlie relationship attributes can have an effect on how the salutation and content of the email is monitored and analyzed and on possible actions if a discrepancy is determined. For example, if Charlie attempts to use the salutation "Rich Wazzup!" in an email to Richard that also copies Jory where the Charlie/Richard friendship value is 10 and but the Jory/Charlie friendship attribute value is 5 and the Jory/Charlie professional attribute value is 10 then the salutation can be flagged to require affirmative approval from Charlie before the message is sent. Approval might be a dialogue box or other alert displayed that requires a "yes" or "no" selection after Charlie indicates the message is to be sent. Naturally, many variations on use of relationship attributes to determine intent are possible.

A similar analysis to that described above with respect to including text can be used to check for text that should be removed or modified. For example, line 114 of FIG. 2A states "BTW, did I tell you that a patent I wrote got licensed for $100M?" The monitoring process can record such statements and if a similar or identical statement had previously been sent to the same user then the statement can be flagged for possible deletion or modification by the sender. This approach can be used to send different variations to different users. In the example of FIG. 2A, if Richard had been provided with text similar to line 114 in the past but Jory was not, then two versions of the email can be automatically sent (or sent upon approval after informing the author, Charlie) so that Jory receives line 114 but Richard does not. A variation of this approach is to show Richard that line 114 is a repeated statement but was sent anyway for Jory's benefit. This might be shown by having line 114 grayed, or dimmed, in Richard's copy of the message. Or an annotation can be made on, adjacent to, or otherwise associated with line 114's text such as "for Jory's benefit" or "—previously sent text omitted - - -," "Jory" etc. This approach can be especially useful where the amount of text is lengthy or may be sensitive to an individual. In general, any manner of suitable indication can be used to show that text has been included and/or removed specifically for one or more recipients but not for all recipients. In some applications, no indication to the recipients may be needed, or desired.

One feature of the invention provides for "second order effects" whereby a first user's intent is checked not only when the first user sends an email to a second user (a "first order effect") but also when the second user (or a different user) sends the first user's text to a third user (a "second order effect"). For example, if Charlie had included text to Richard and Richard then forwards that email to Jory, a second order effect might remove or modify a portion the text if the text was redundant, offending, restricted, etc. Another example is where text is intended for only a few people or for internal organization use. If text from the first user is attempted to be sent to a person not in a predetermined list, outside of an organization, etc. then the first user's approval may be required before the email can be sent by a subsequent user. In general, any of the operations described herein for a first order effect can be applied to a second order effect, or to any subsequent forwarding or re-sending of the first user's communication, as desired.

FIG. 2B shows Richard's response to Charlie's initial email. An additional recipient, Jacques, has been BCCed so that Jacques email address or the fact that Jacques had been copied is not apparent to the recipients Jory and Charlie. One feature checks for types of content that a person, company or other entity may want to restrict and ensures that non-approved people are not sent the restricted information. For example, a check could be made to look for keywords for legal or patent-specific terms. If an attempt is made to send the content to a person who is not on a pre-approved list then an alert in the form of a dialogue box can be displayed to the sender stating the determination that has been made and asking for affirmative approval to send the email. One check would include whether an attorney or other specialized consultant who is likely to generate or be copied on sensitive material is involved in a message distribution or thread. If so, and if it is also determined that others are copied who have not previously participated in these types of correspondence, then an alert mechanism can be invoked.

FIG. 2C illustrates Jacques' response to Richard's email. In this case Jacques has inadvertently copied everyone in the thread including Charlie who was not an intended recipient. One feature of the invention checks for whether a first-time recipient is the result of replying to an email sent by another person. Often when a first person is sending an email to another for the first time there should be a polite salutation or introduction. In a case where someone is being sent an email for the first time in the CC or BCC lines such an alert can be used to verify (e.g., by requiring affirmative assent from the sender) that the email should go to the first-time recipient. This can be especially useful in situations where message tone (e.g., angry, informal, etc.) is determined as not suitable for someone that is being sent a message for the first time. Tone can be determined by, for example, using natural language processing techniques, by looking for keywords (e.g., slang, cursing), by detecting punctuation (e.g., exclamation marks, capitalization of words, phrases or sentences, etc.).

Similarly, Charlie's response to Jacques' email can be analyzed with regard to this being a first-time reply to a person who has an email domain of a client. The tone in Charlie's reply could be detected by various processing methods, described above. Additionally, the early morning time of sending the message can be used in evaluating the appropriateness of the message. In such cases a "hold" on sending the message can be imposed so that approval after a few hours is required to send the message. Other variations on detecting inappropriate messages can include requiring the sender to perform an action that requires patience, self-awareness or introspection, such as solving a puzzle, answering a question, performing a sobriety test, etc. The results from such actions or tests can be provided to the control process or another process in the system to decide whether the message should be sent, held, modified, or to have other action taken.

Although particular embodiments of the invention have been described, variations of such embodiments are possible and are within the scope of the invention. For example, although intent or intention data has been discussed as the basis for determining how communications are handled, other types of data can be used including behavior, intentions of others with respect to a sender's message, etc. Some features of the invention may be applied to non-text and non-visual information such as to voice transmissions.

Any suitable programming language can be used to implement the functionality of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments unless otherwise specified. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. The functions may be performed in hardware, software or a combination of both.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. Functions and parts of functions described herein can be achieved by devices in different places and operating at different times. For example, a processor can perform its functions in "real time," "offline," in a "batch mode," etc. Parallel, distributed or other processing approaches can be used.

Reference throughout this specification to "one embodiment", "an embodiment", "a particular embodiment," or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. For example, distributed, networked systems, components and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

The invention claimed is:

1. A computer-implemented method for processing an electronic communication, the method comprising:
  obtaining intention data, wherein the intention data indicates an intent of a user with respect to the user's electronic communications, the intention data being derived from prior electronic communications associated with the user,
  accepting a signal from an input device to define content for a present electronic communication, the present electronic communication comprising a header portion specifying an addressee and a body portion;

detecting a deficiency in the body of the present electronic communication by analyzing at least a portion of the present electronic communication and the intention data; and correcting the deficiency by automatically modifying the contents of the body of the electronic communication.

2. The method of claim 1, wherein the step of correcting the deficiency in the content of the present electronic communication further comprises:

recording a pattern of the user's prior electronic communications;

determining that the present electronic communication does not fit the recorded pattern; and modifying the present electronic communication to fit the pattern.

3. The method of claim 2, wherein the modifying is done at least in part automatically.

4. The method of claim 3, wherein the modifying is done at least in part manually.

5. The method of claim 2, wherein the recorded pattern includes an analysis of responses to the user's prior electronic communications.

6. The method of claim 2, wherein the recorded pattern includes characteristics of typical responses.

7. The method of claim 2, wherein the recorded pattern includes header properties.

8. The method of claim 2, wherein the recorded pattern includes determining a similarity to prior electronic communications.

9. The method of claim 8, further comprising:

alerting the user at a time of creating present content that at least a portion of the present content is identical to at least a portion of prior content.

10. The method of claim 8, further comprising:

using elapsed time between transmission of prior electronic communications in determining the similarity to prior electronic communications.

11. The method of claim 2, wherein the recorded pattern includes a measure of a time of response to prior electronic communications.

12. The method of claim 1, wherein the step of detecting the deficiency further comprises:

analyzing the present electronic communication to determine an established human psychological factor present in the present electronic communication; and comparing the determined established human psychological factor with the present electronic communication; and wherein the step of correcting the deficiency further comprises alerting the user if the present electronic communication deviates by more than a threshold amount from the established human psychological factor.

13. The method of claim 12, wherein the established human psychological factor includes a measure of the user.

14. The method of claim 12, wherein the established human psychological factor includes a measure of an intended recipient.

15. The method of claim 12, wherein the established human psychological factor includes a measure of affection.

16. The method of claim 12, wherein the established human psychological factor includes a measure of anger.

17. The method of claim 12, wherein the established human psychological factor includes a measure of style of the present electronic communication.

18. The method of claim 1, wherein the step of correcting the deficiency further comprises:

holding the electronic communication before transmission.

19. The method of claim 1, wherein the step of correcting the deficiency further comprises:

displaying a prompt to the user regarding at least a portion of the electronic communication that fails to meet a criterion based at least in part on the intention data.

20. The method of claim 19, further comprising:

requiring the user to perform a task before transmission of the present electronic communication.

21. The method of claim 20, wherein the task includes: entering a password.

22. The method of claim 20, wherein the task includes solving a puzzle.

23. The method of claim 20, wherein the task includes: performing a sobriety test.

24. The method of claim 1, wherein the step of correcting the deficiency further comprises:

displaying a suggested modification to the user regarding at least a portion of the electronic communication that fails to meet a criterion based at least in part on the intention data.

25. The method of claim 1, wherein the step of correcting the deficiency further comprises:

indicating to the user a reason that the electronic communication fails to meet a criterion based at least in part on the intention data.

26. The method of claim 1, wherein the intention data is obtained at least in part from information in the user's email in-box.

27. The method of claim 1, wherein the intention data is obtained at least in part from information in the user's email sent items.

28. The method of claim 1, wherein the intention data is obtained at least in part from information on a server computer that sends electronic transmissions.

29. The method of claim 1, wherein the step of detecting the deficiency in the present electronic communication comprises identifying a discrepancy between a user's intent and the probable meaning or effect of: the content of the message, an attribute of the message, or a combination thereof.

30. The method of claim 1, wherein the step of correcting the deficiency:

recording a pattern of characteristics of the user's prior electronic communications to the addressee;

determining that the present electronic communication does not fit the recorded pattern; and automatically modifying the present electronic communication to fit the pattern.

* * * * *